INVENTOR
Harold O. Kron

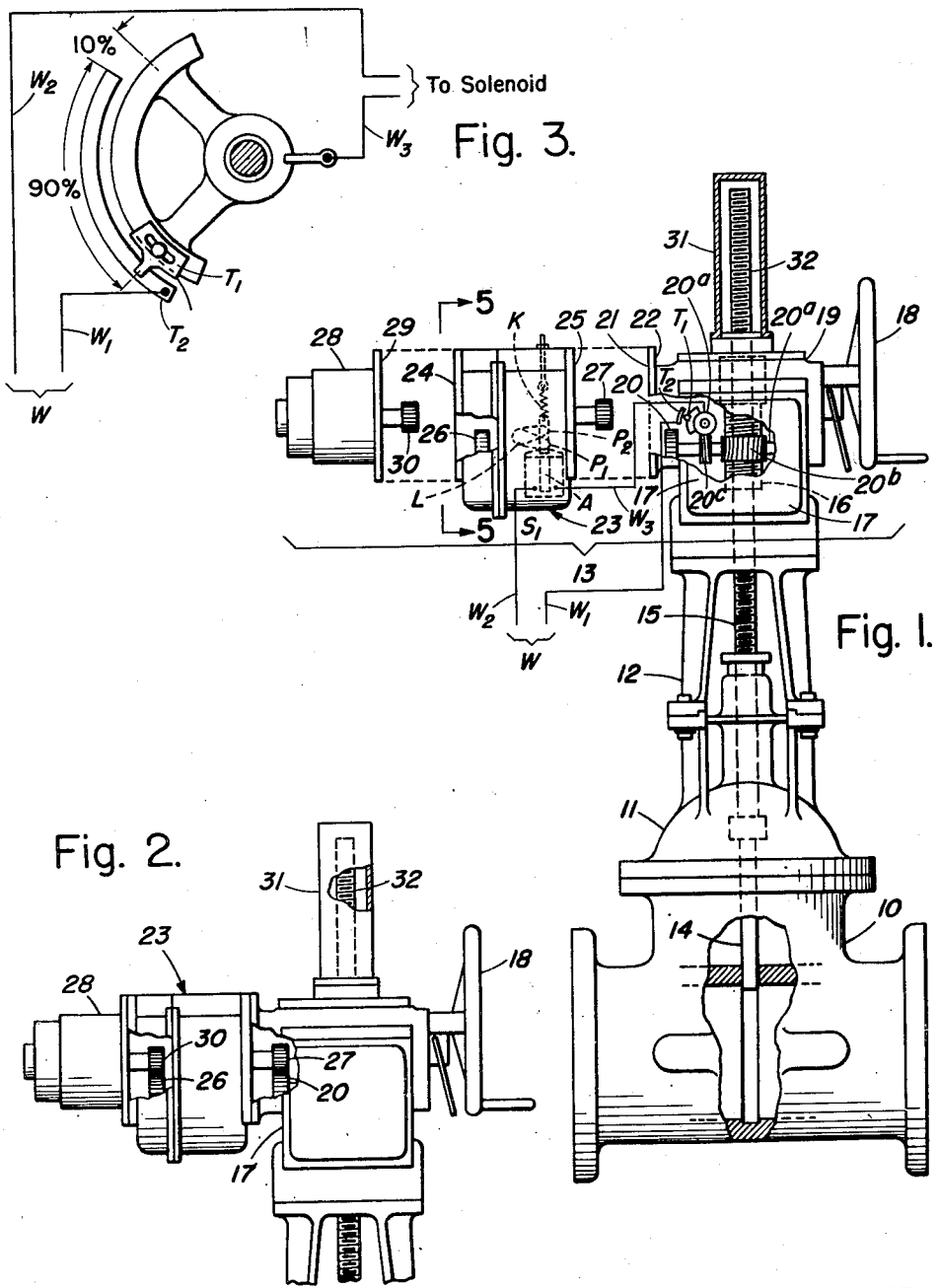

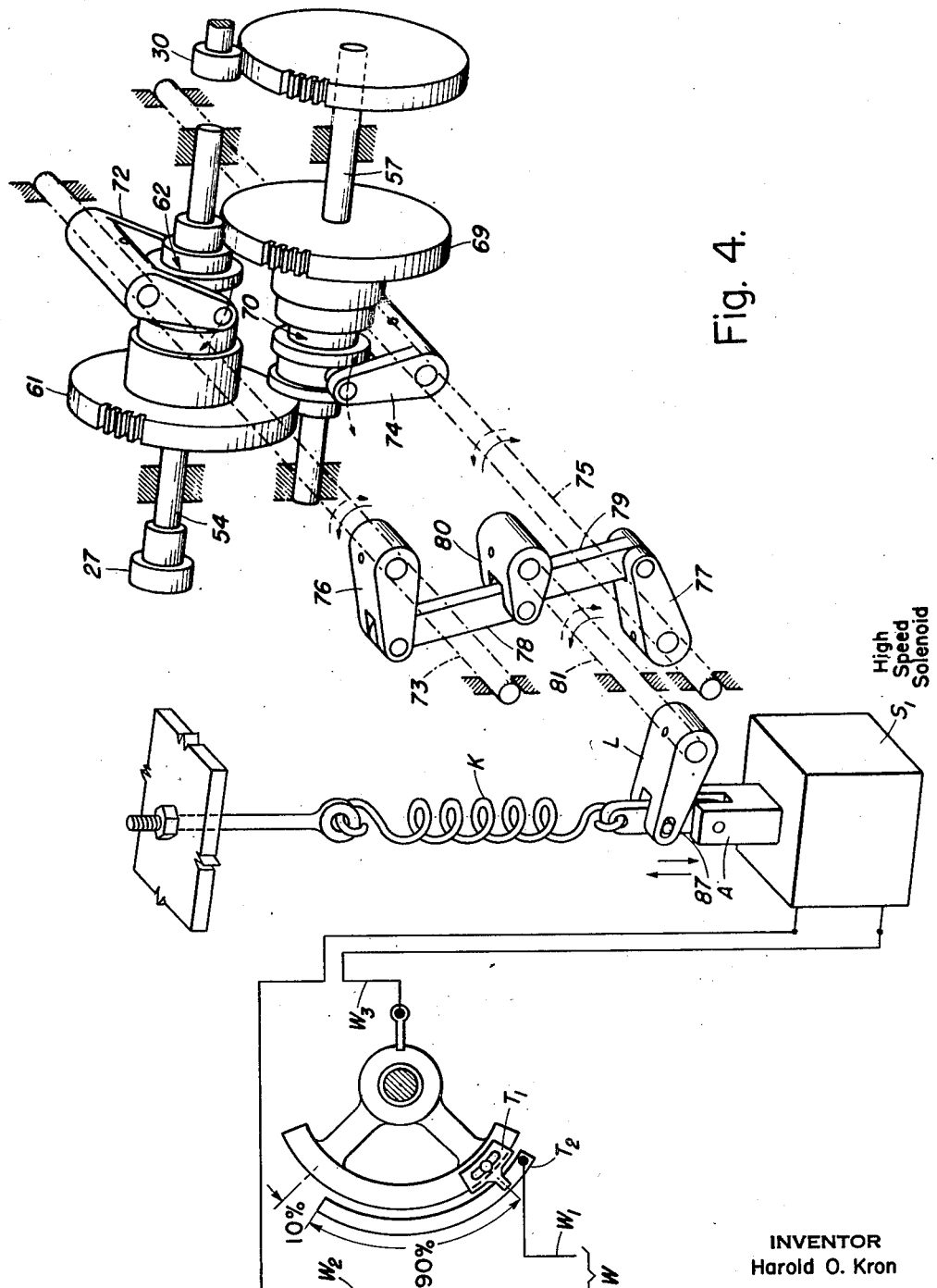

April 14, 1953  H. O. KRON  2,634,623
VALVE CONTROL

Filed Aug. 8, 1951  6 Sheets-Sheet 5

High Speed Setting

Low Speed Setting

INVENTOR
Harold O. Kron
BY
Arthur Middleton
ATTORNEY

Patented Apr. 14, 1953

2,634,623

UNITED STATES PATENT OFFICE 2,634,623

VALVE CONTROL

Harold O. Kron, Philadelphia, Pa., assignor to Philadelphia Gear Works, Inc., Philadelphia, Pa., a corporation of Pennsylvania Application August 8, 1951, Serial No. 240,861

12 Claims. (Cl. 74—335)

1

This invention relates to motor-operated valves, such as plug-, globe-, butterfly-, or gate-valves, and more particularly to a control devices for the valve-operating mechanisms whereby the opening- and the closing-movements of the valve are initiated as by push-button operation and stopped automatically by suitable limit stop devices. These movements are affected rapidly as compared with earlier hand-operated valves. The motor-operated mechanism avoids undesirably long delays incident to the closing or opening especially of large size valves by hand-operated mechanism, and facilitates the control from a central station.

More specifically, this invention relates to improvements in the control devices in view of a surge pressure problem arising especially where large motor-operated valves are installed in long pipe lines carrying fluids such as water, oil, or gas. This surge problem is herein also termed the water hammer problem or the hammer blow problem, it being due to whichever kind of the aforementioned fluids the pipe may be carrying. That problem arises when a motor-operated valve closing at the usual motor-controlled rapid rate causes a sudden and dangerous surge or rise in pressure to develop in the pipe at the inflow side of the valve not unlike a hammer blow in its effect.

This phenomenon is explained by the fact that the mass of fluid in forward motion in the pipe if brought to a more or less sudden halt by the rapid closing of the valve exerts its momentum or impact upon the valve, and upon the associated pipe walls, and indeed may react upon the pump station. Hence, the faster the valve closes, the more sudden is the motion of the fluid mass brought to a stop, and consequently the greater is the momentum, impact, and resultant pressure surge.

The development of the surge pressure may assume varying characteristics if plotted in a graph as a function of the closing movement of the valve. The shape of the surge pressure curve in such a graph depends upon the speed of valve-closing as well as upon such local structural factors as pipe diameter and the extent of free length of pipe before and after the valve. For example, under one set of conditions such a graph may represent a curve in which the pressure does not rise appreciably until the valve is in its final closing stage and perhaps only during the last 10% of the closing movement where the pressure curve is rises steeply to a pressure value of objectionable magnitude. Under another set of conditions the pressure rise may

2 develop more gradually in the course of the valve-closing movement although its final magnitude may be objectionably great. Such conditions in pipe lines have been discussed in a paper by S. L. Kerr entitled "Surge Problems in Pipe Lines."

At any rate, such pressure surge is likely to attain a sudden maximum during the final phase of the closing movement of the valve and may reach such dangerously high proportions as would damage the pipe or the valve, or pump station, unless suitable pressure relief measures are provided. Usually there are provided surge pressure responsive relief systems comprising automatic relief valves, check valves, additional piping, and storage facilities for fluid that is allowed to escape from the pipe to prevent excessive surge pressure.

For example, in many instances, especially on high pressure lines it is customary to use by-pass valves in conjunction and in cooperative association with a motor-operated main valve in the line, to accomplish a two-fold purpose. That is, one function of the by-pass valve is to be kept open while the motor-actuated main valve is being closed slowly in order to prevent surge. The other function of the by-pass valve is that when a large diameter pipe line valve is to be opened, the by-pass valve is opened first for the purpose of equalizing to a large extent the pressure of the fluid on the valve disc so that the valve may be easily opened.

While this invention applies to any type of valve, be it a plug-, a butterfly-, or a gate-valve, for convenience the invention will hereinafter be described as one specific example by referring to the gate type of valve which is opened and closed by the non-rotating but axial or linear movement of a threaded valve stem or spindle moving in a power-rotated sleeve-like nut which is confined against movement in an axial or linear direction.

In a practical valve-actuating unit the sleeve nut is rotated by a worm drive in which the worm shaft is operationally coupled with certain well known limit switch devices for automatically stopping the drive motor at the end of the opening movement as well as at the end of the closing movement of the valve gate. The invention will herein be exemplified by controls governed by such a worm drive.

It is one object of this invention to avoid the need for the aforementioned surge-preventing by-pass valves and appurtenances by providing automatic controls for sufficiently retarding the closing movement of the gate member substantially during that phase thereof where otherwise an objectionable rise in surge pressure would occur. By sufficiently retarding is meant that the slow-down should extend over the critical portion of the gate travel and should be sufficiently slow to allow the surge to be absorbed to a degree desired.

To this end the invention provides for a two-speed change gear drive for the valve-actuating mechanism and monitor means for automatically controlling the change from high to low speed at a desired point of the closing movement of the gate, to allow the gate to move at slow surge-absorbing speed until seated incident to automatic stoppage of the drive.

Another object is to provide automatically increased initial power for opening the valve. This is allowed by a two-speed drive for actuating the valve so that it initially operates in low speed and then automatically changes to high speed.

Still another object is to provide an attachment whereby existing motor-operated valve units installed in the field can be converted into two-speed units for the purpose of this invention.

This object is attained by providing a two-speed change gear box insertable between the existing motor and the existing valve-operating mechanism proper.

According to one feature, the gear change mechanism comprises a pair of clutches mounted on respective parallel shafts. These clutches are operationally interconnected or interlocked by an interlocking member in such a manner that the one clutch is engaged when the other is disengaged and vice versa by the movement of the interlocking member. Mechanism is provided for effecting the movement of the interlocking member in timed relationship with the movement of the valve gate, namely so that the gears are changed at a predetermined intermediate point of the stroke or travel of the gate. In this way the gears are changed from high speed to low speed at a predetermined point of the closing movement of the gate and kept at low speed during the subsequent final portion of that movement, and conversely so that the gears are kept in low speed during a predetermined initial portion of the opening movement of the gate, and are changed to high speed at the end of this initial low speed movement.

According to another feature, provision is made for a gear change actuating member to be normally held in low speed position by mechanical spring power, but to be automatically shifted into high speed position by the power of a solenoid energized by the closing of switch means timed with the operation of the drive mechanism so as to execute the gear change to high speed when the mechanism starts closing the gate. At a predetermined intermediate point of the gate closing movement the switch is opened allowing the spring power to shift the actuating member to change the actuating member back to low speed position. In this way, should the solenoid fail, the mechanism will operate safely at low speed throughout whether opening or closing the gate.

Another feature provides adjusting devices for varying the point of speed change related to the movement of the gate.

According to another feature existing units of motor-operated valves can be converted into two-speed units by interposing between certain sections of existing valve units, namely between the motor and the actuating mechanism proper, a two-speed gear box which when inserted becomes unitary with the actuating mechanism without change of existing parts and without otherwise disturbing the valve unit as installed.

According to another feature a two-speed gear box is attached to an existing valve construction in which an encased motor has a flange connection with the casing of the valve-actuating mechanism, and in which a pinion fixed on the inner free end of the motor shaft meshes with an exposed gear which is part of the valve-actuating mechanism. The valve-actuating mechanism is herein also briefly termed the actuator mechanism while its casing is termed the actuator casing. The two-speed gear box is inserted between and flange connected to the motor housing and the actuator casing. The gear box presents at one end an exposed gear simulating or corresponding to the exposed gear of the actuator mechanism and to mesh with the motor pinion, and at the other end an exposed pinion simulating or corresponding to the motor pinion and meshing with the exposed gear of the actuator mechanism.

In one embodiment of this invention the two-speed gear box has two shafts, a primary shaft and a countershaft journalled in the end walls of the gear box, change gears mounted upon the shafts and a clutch on each shaft shiftable in unison so that the motor pinion may either drive the actuator mechanism directly and at high speed through the primary shaft, or indirectly and at low speed through the countershaft. That is to say, the clutches are operatively so interconnected or interlocked that by causing one clutch to be engaged, the other clutch becomes disengaged and vice versa. This shifting of the clutches in one direction is effected automatically at a predetermined although adjustable point of the valve-closing movement, and is effected automatically in the opposite direction when the valve gate reaches substantially the same point during its opening movement. In this way the movement is automatically stepped down from high to low while closing and stepped up from low to high while opening the valve. This affords the desired surge-preventing slow speed for seating the valve gate as well as extra power for unseating it.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Other features and advantages will appear as this specification proceeds.

In the drawings:

Figure 1 is a general more or less schematic part-sectional view of a gate valve unit embodying the invention with parts of the drive mechanism drawn apart to illustrate the converting of a standard gate valve unit into a two-speed unit, also showing gear changing switch means actuated by the worm gear drive mechanism that rotates the yoke nut.

Figure 2 is a view of the top portion of the device of Figure 1 showing the drive mechanism assembled for two-speed operation.

Figure 3 shows two-speed controlling switch means adapted for rotary motion.

Figure 4 is a perspective view of the reciprocable solenoid-actuated two-speed mechanism with parts drawn apart, the solenoid operating against spring tension for changing the gears from low speed to high speed.

Figure 5:
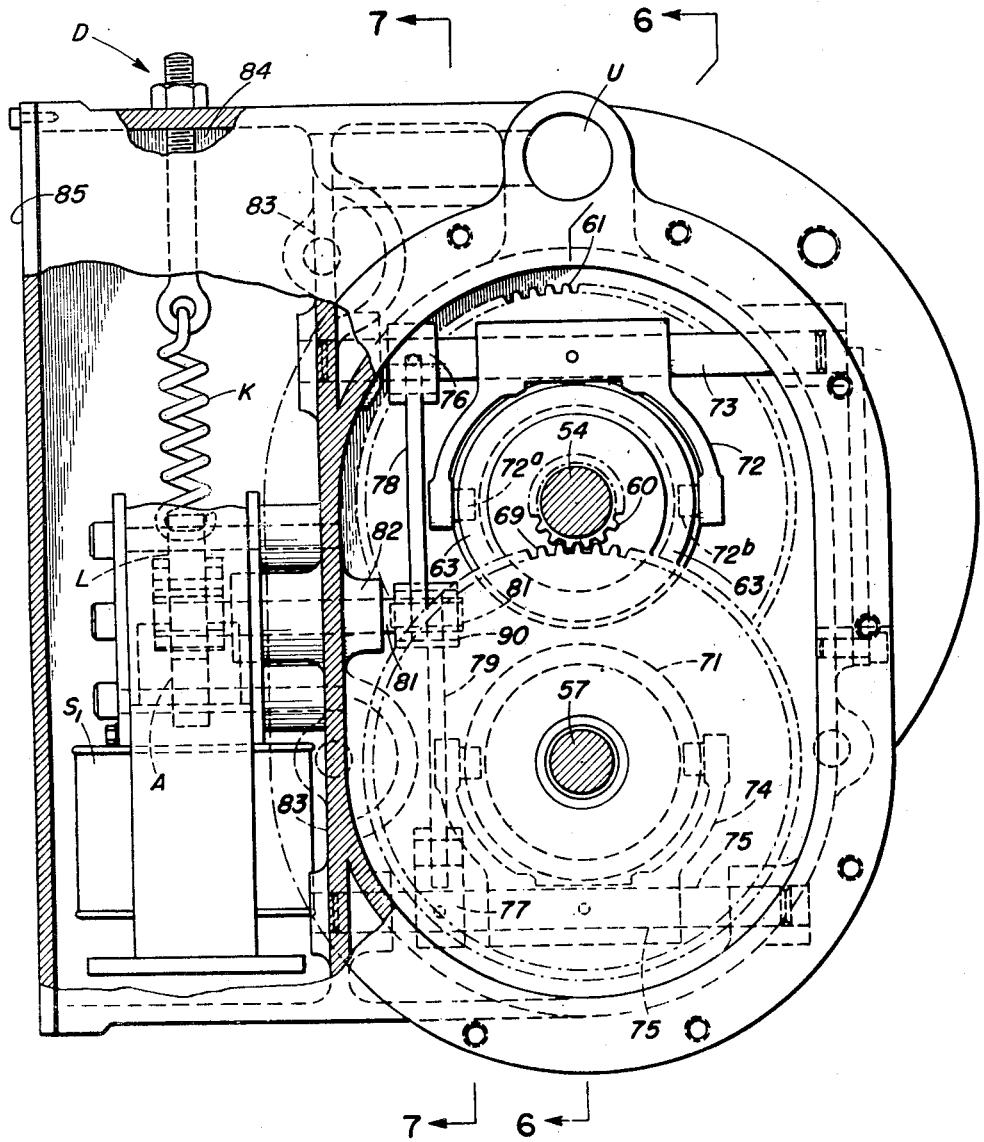
Figure 5 is a part-sectional end view upon the input end of the individual two-speed gear box taken on line 5—5 of Figure 1.

In an overall view of Figures 1 and 2 a power-actuated gate valve unit of one type comprises a valve body 10, a valve casing or hood 11, a yoke 12 carrying powered valve-actuating devices 13, and a valve gate 14 having a threaded valve stem or spindle 15. This stem and thus the gate perform a rectilinear movement when opening or closing the valve by the rotation of a nut 16 (sometimes called a sleeve or sleeve-nut or even a yoke-nut) driven by the devices 13. Such a power driven unit has limit switch devices for automatically cutting the power to stop the movement of the gate member at the end of its closing or opening-travel, such limit switch devices being here indicated merely by switch box 17. Usually stand-by mechanism for actuating the spindle is indicated by a hand-wheel 18.

Figure 10:
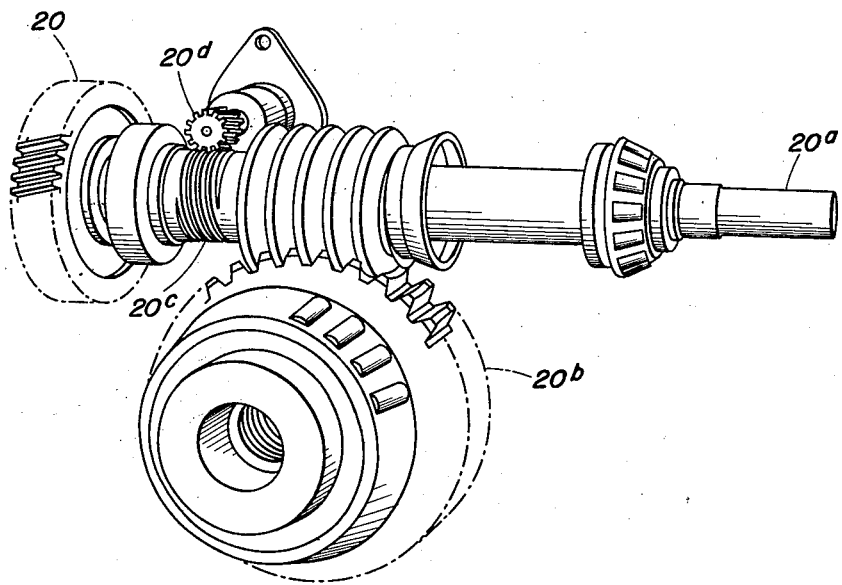
Figure 10 is a greatly enlarged detail perspective view of elements of the worm gear drive mechanism operatively connected with drive- and timing-gear for the gear changing switch means.

The actuating devices 13 comprise a casing 19 in which the nut 16 is mounted for rotation although secured against axial displacement. The casing 19 also contains a gear train or suitable gearing for rotating the nut 16, such gear train being indicated by an input gear 20 fixed upon the free end of worm shaft 20ª which is rotatably mounted in the casing 19. The worm shaft has a worm (not visible in Figure 1) meshing with a worm gear 20ᵇ which surrounds and is unitary with the nut 16. A rotatable sliding contact member T₁ is movable with respect to a stationary contact member T₂. The rotatable member T₁ is geared up to the worm shaft 20ª by a timing gear (see also Figure 10), namely an auxiliary worm 20ᶜ provided upon worm shaft 20ª adjacent to the input gear 20 and meshing therewith an associated auxiliary worm gear 20ᵈ rotatably mounted in the casing 19. Thus when this auxiliary worm 20ᶜ is rotated because of the operation of the drive mechanism it opens and closes the contact members in timed relation to the travel of the gate, the arrangement being such that the contact members T₁ and T₂ are closed during the initial portion of the gate travel when the gate closes but are open during the balance of such gate closing movement, and vice versa that the contact members are open during the initial portion of the gate travel when the gate opens, but are closed during the balance of such gate opening movement The closing of the contact members T₁ and T₂ energizes a solenoid S₁ to pull in an armature A against the tension of a spring K, thereby moving an operating lever L for changing gears from low speed to high speed, the gear change mechanism and its operation to be described further below. That is to say, the tension of spring K normally maintains the operating lever L in low speed position, whereas the armature A when the solenoid is energized moves it to high speed position. Electrical power supply for the solenoid is indicated by power supply W and conductors W₁ and W₂ leading to the solenoid S₁ and to the rotary conductor T₁ respectively, and by an interconnecting conductor W₃ between the solenoid S₁ and the contact member T₁. The casing 19 has a lateral opening or input end 21 provided with a flange 22 so that a two-speed gear box 23 may be connected thereto. This gear box has an input end 24 and an output end 25, and contains two-speed gearing having an input gear 26 and an output pinion 27. Driving relationship between the two-speed gearing in the gear box 23 and the gearing in the casing 19 is established by output pinion 27 meshing with input gear 20 (see Figure 2). The actuating member or lever L upon the gear box 23 is reciprocable between high-speed and low-speed position for changing speeds from high to low and from low to high in accordance with the requirements of this invention.

The two-speed gear box 23 is powered by a motor unit 28 having a flanged output end 29 and an output pinion 30. Connecting the motor unit to the two-speed gear box establishes driving connection by output pinion 30 meshing with input gear 26 (see Figure 2).

The two-speed gear box 23 also contains power means for reciprocating the speed change lever L between high-speed position and low-speed position, indicated at P₁ and P₂ respectively, namely solenoid S₁, armature A and tension spring K acting on armature A. If solenoid S₁ is energized it will move the lever L into high-speed position P₁ while overcoming the tension of spring K, if solenoid S₁ is de-energized the tension of spring K will move lever L into low-speed position P₂. To effect speed change the solenoid S₁ must be actuated in this manner at a predetermined point of gate travel to throw the lever L either in the one or the other direction as the case may be. That is to say, during gate closing after the stem 15 has moved an initial portion of its total travel at high speed with the solenoid S₁ energized, the lever L should be thrown from its high speed position to its low speed position due to de-energization of the solenoid and action of spring K, so that during the balance of its closing travel the stem and its gate will move at low speed and will close gently until automatically stopped by limit switches in switch box 17. Conversely, when the gate opens it should do so at low speed and continue at that speed through a minor initial portion of its rise whereupon a power impulse due to closing of the contacts T₁ and T₂ and energization of solenoid S₁ should automatically throw lever L from its low-speed position to its high-speed position, so that the gate may complete its opening movement through the remaining major portion of its rise at high speed until automatically stopped by the limit switch in switch box 17.

Referring to Figures 4 to 9 there will now be described the interior as well as the operation of the gear box 23 containing the two-speed gear mechanism as well as the solenoid power means for actuating the same.

Figure 6:
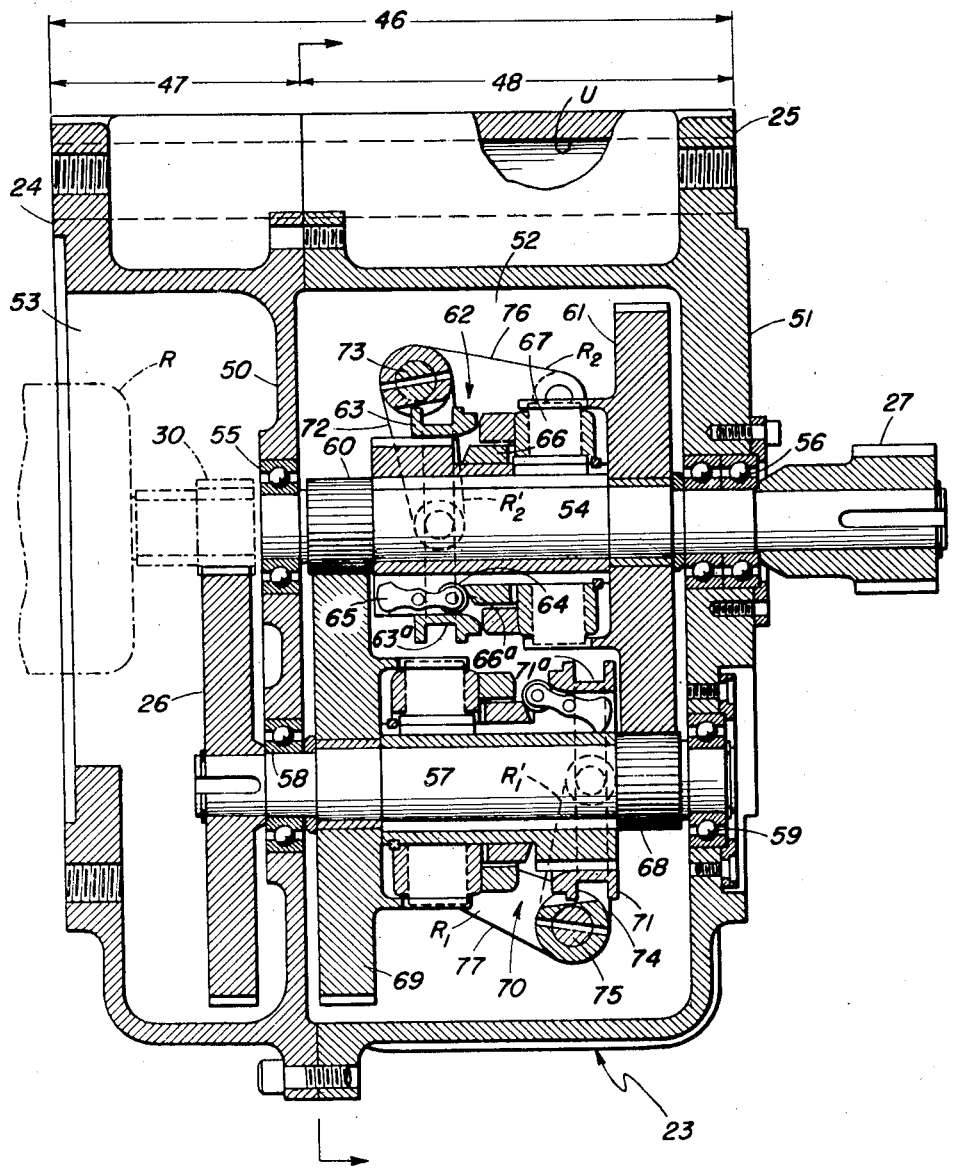
Figure 6 is a longitudinal sectional view taken on line 6—6 of Figure 5.
Figure 8:
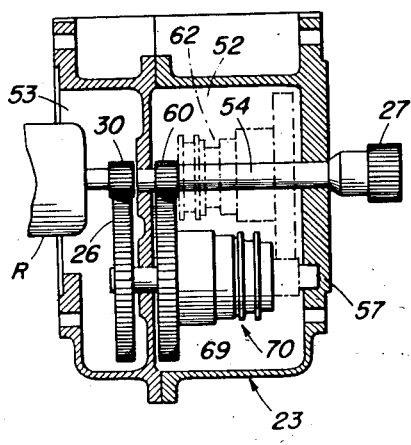
Figure 8 is a schematic and reduced sectional view, otherwise similar to Figure 6 of the two-speed gear box set for high speed drive, with the then inactive parts shown in dotted lines.
Figure 7:
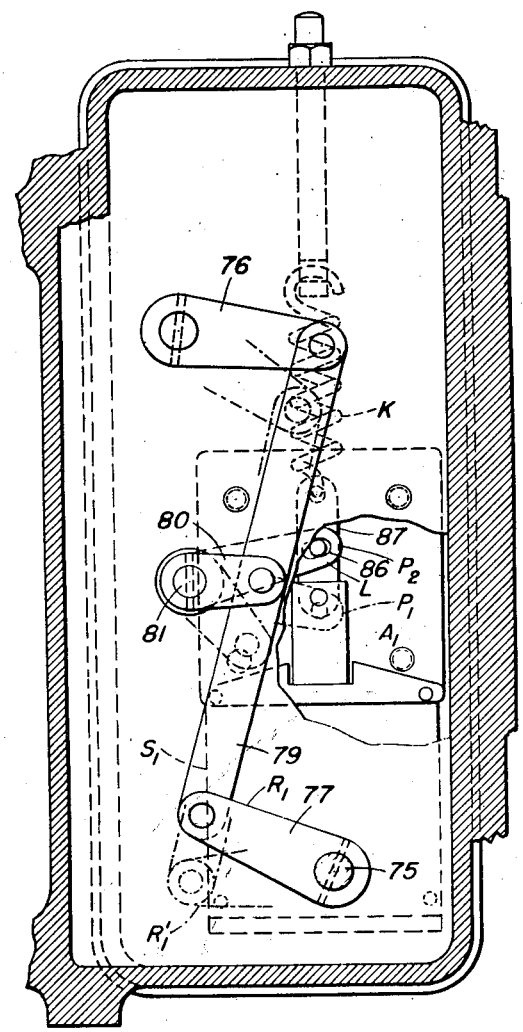
Figure 7 is a sectional view taken on line 7—7 of Figure 5.
Figure 9:
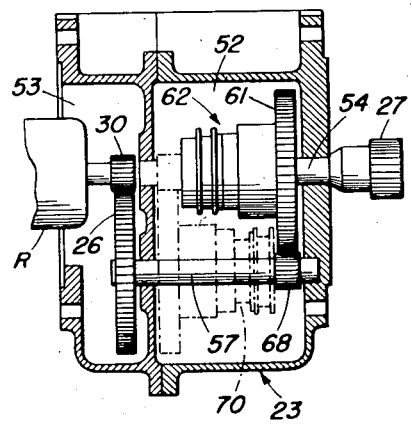
Figure 9 is a view similar to Figure 8 although with the gear box set for low-speed drive, and with the then inactive parts shown in dotted lines.

While Figures 5, 6 and 7 present structural sectional views of the gear box 23, it is by the perspective of Figure 4 and by the operational views of Figure 8 and 9 that the function of the mechanism appears most clearly, the perspective view of Figure 4 being taken upon Figure 5 viewed in the general direction of arrow D.

The two-speed mechanism is housed or mounted in a casing 46 which is split into two sections herein termed the input section 47 and the output section 48, these sections being interconnected by an intermediate flange and bolt connections 49. The ends of this casing present the flanged input end 24 and the flanged output end 25. The sections 47 and 48 have end walls 50 and 51 respectively defining a closed main gear chamber 52 and an open auxiliary gear chamber 53. The gear casing 46 is formed to have integral therewith a longitudinal duct U through which may extend electrical leads between motor unit 28 and the limit switch box 17.

A main shaft 54 herein also termed the high speed shaft is mounted to rotate in the end walls 50 and 51 by means of ball bearings 55 and 56. A counter shaft 57 extending parallel to the main shaft is similarly mounted by means of ball bearings 58 and 59. The main shaft 54 has an end portion herein termed the output end which extends beyond the end wall 51 and carries fixed thereon the output pinion 27. The countershaft herein also termed the low-speed shaft has an end portion herein termed the input end portion which extends beyond the end wall 50 and carries fixed thereon the input gear 26.

The main shaft 54 has fixed upon it a pinion 60 disposed adjacent to end wall 50 and to roller bearing 55, and it also carries a large loose gear 61. Interposed between the pinion 60 and the loose gear 61 is a first clutch 62 herein also termed the high-speed clutch which of itself is of a known construction whereby the loose gear can be coupled to or uncoupled from the shaft 54 by axially shifting a shift ring or collar 63 having an annular groove 63ᵃ. This collar rotates with the shaft 54 and if shifted towards the gear 61 it will depress a set of cam rollers 64 mounted on rockers 65 unitary with the shaft 54, which cam rollers bear down upon a cam face 66ᵃ of a cam ring 66 moving it to engage the gear 61 to the shaft by compressing familiar clutch leaves indicated at 67. The clutch 62 in Figure 6 is shown to be thus engaged.

The countershaft 57 has fixed on it a pinion 68 disposed adjacent to the end wall 51 and to roller bearing 59, while a gear 69 of the same pitch diameter as gear 26 is loose upon that shaft and disposed adjacent to the end wall 50 and to roller bearing 58. A second clutch 70 herein also termed the low-speed clutch is interposed between pinion 68 and gear 69 and is operable for making or breaking the drive connection between the gear 69 and shaft 57, the clutch itself being identical to clutch 62 and operable by moving its shift ring or collar 71 by way of its annular groove 71ᵃ.

Actuating mechanism is provided whereby the clutches 62 and 70 are operationally so interlocked that when one clutch is being engaged the other becomes disengaged and vice versa. In other words, the gear box 23 is set for high-speed operation (see also Figure 8) when clutch 62 is disengaged for gear 69 to rotate with counter-shaft 57 due to clutch 70 being engaged, and gear 69 meshing with pinion 60 to rotate the high-speed shaft 54. The gear box 23 is set for low-speed operation (see also Figure 9) by reversing the condition of the clutches to engage clutch 62 and disengage clutch 70, so that gear 61 is connected to main shaft 54 while gear 69 becomes disconnected from counter-shaft 57. Pinion 30 meshing with gear 26 then rotates the counter-shaft 57 together with pinion 68 which in turn meshes with gear 61 to rotate the main shaft 54.

Clutch 62 is actuated by a rockable fork 72 having a pair of pins 72ᵃ and 72ᵇ lodging in the annular groove of shift ring 63. The fork 72 is unitary with a rocker shaft 73 disposed above and extending transversely of main shaft 54 and journalled in the side walls of gear chamber 52. Similarly clutch 70 is actuated by a rockable fork 74 unitary with a rocker shaft 75 disposed underneath and extending transversely of counter-shaft 57 and parallel to rocker shaft 73 and journalled in the side walls of gear chamber 52.

The rocker shaft 73 has fixed thereto an arm 76 and the rocker shaft 75 has a similar arm 77, both arms pointing in direction opposite to each other. Both arms are operatively interconnected by a pair of links 78 and 79 the outer ends of which are connected to arms 76 and 77 respectively while their inner ends are both connected to a common actuating arm 80 fixed upon a master rocker shaft 81 which is rockable in a bearing portion 82 of side wall 83 of gear chamber 52. Indeed this side wall 83 constitutes a portion of a chamber 84 extending laterally from the casing portion 48. The inner end of master rocker shaft 81 thus extends into gear chamber 52 while its outer end extends into the lateral chamber 84 the outer end of which is closed by removable closure plate 85.

The outer end of master rocker shaft 81 has fixed upon it the aforementioned primary actuating arm or lever L herein also termed a reciprocable actuating member which is operatively connected to the aforementioned solenoid S₁. That is to say, the arm L has its outer end connected as by slot and pin connection 86 to armature A of the solenoid. The solenoid by being energized will rock the arm L and thereby the rocker arms 76 and 77 between low-speed and high-speed positions as indicated (see Figure 7) by the full line positions R₁ and R₂ and the dot-and-dash line positions R₁' and R₂' of these arms.

*Operation*

While the valve is either in open or in closed position and the actuating mechanism is at rest, the solenoid S₁ remains deenergized with the spring K holding the clutch actuating lever L in low-speed position. When the valve is open, in order to close it the motor 28 is started to set the actuating mechanism in motion. Provision is made whereby at that time the solenoid S₁ is energized so as to draw the armature A overcoming the tension of spring K, thereby shifting the lever L from low-speed position to high-speed position. That is to say, at the start of the closing movement, the gears in gear box 23 are at once automatically changed from the Fig. 9 low-speed setting to the Fig. 8 high-speed setting. In other words, the shifting of the lever L (see Fig. 7), from its full-line position to its dot-and-dash line position, releases clutch 62 while engaging clutch 70, thereby changing the gears from the setting of Fig. 9 to the setting of Fig. 8.

The motor 28 through the gear train in the gear box rotates the worm shaft 20, which moves the gate-valve member 14 and simultaneously moves the rotary contact member T₁ through timing gears 29ᶜ and 29ᵈ upon and along the stationary arcuate contact member T₂, the contact members T₁ and T₂ being effective to maintain an energizing circuit for the solenoid $S_1$. Thus, during the opening movement, the gears remain set for high speed of the valve member as long as contact member $T_1$ travels along and upon contact member $T_2$, namely, during about 90% of the total valve-closing movement. But when contact member $T_1$ reaches the end of contact member $T_2$ and breaks contact therewith, the solenoid $S_1$ becomes de-energized, this interruption of the circuit allowing the spring K to restore the gears in gear box 23 from the Fig. 8 high-speed setting to the Fig. 9 low-speed setting. Hence, during the remaining 10% of its closing movement, the valve gate member travels at reduced speed, thereby preventing surge pressure of undue magnitude from developing in the pipe line on the upstream side of the valve. When the valve gate member reaches its seat at the end of its closing movement, the motor 28 is automatically stopped by the usual limit switch devices with the gears remaining in low speed.

Vice versa, when the closed valve is to be opened as by starting the motor 28 to rotate in reverse, the valve opens at low speed because of the then low-speed setting (see Fig. 9) of the gears in gear box 23, and thereby provides desirable increase in power for unseating and opening the valve. Low speed is maintained during the initial 10% of the valve-opening movement while the rotary contact member $T_1$ is out of contact with contact member $T_2$, even though geared up with wormshaft $20^a$ through the timing gears $20^c$ and $20^d$. As the closing of the valve continues, the contact member $T_1$ closes with contact member $T_2$, thus energizing the solenoid $S_1$ to draw armature A against the tension of spring K so as to shift the clutch-actuating lever L to effect a change of gears in gear box 23, from their Fig. 9 low-speed setting to their Fig. 8 high-speed setting. Thus the valve member travels at high speed during the remaining 90% of its opening movement until its movement is stopped by the familiar limit-switch devices stopping the motor.

What is claimed is:

1. A valve unit having an openable and closeable valve member and power operated drive means for operating the valve member to open and to close it as well as for automatically stopping the valve member at the end of each of its strokes; a two-speed gear change mechanism in the drive means comprising a primary shaft, a primary input pinion fixed to the input end of the primary shaft, a larger primary gear rotatable upon said primary shaft and spaced from the input pinion towards the output end of the shaft, a first clutch upon said primary shaft between said pinion and said larger primary gear for connecting said larger primary gear to the primary shaft, a counter-shaft, a secondary larger gear rotatable upon the counter-shaft and meshing with said primary input pinion, a secondary pinion fixed upon the output end of the counter-shaft and meshing with said larger primary gear, a second clutch upon the counter-shaft between said larger secondary gear and said secondary pinion for connecting said secondary gear to the counter-shaft, interlocking means effective between the clutches and operable between low-speed position and high-speed position by engaging one clutch while disengaging the other and vice versa, power means for operating the interlocking means, and control transmitting means governed by the operation of the drive means and in timed relationship to the travel of the valve member for transmitting control to the power means whereby said interlocking means are maintained in low-speed position during the first portion of the opening movement of the valve member, then are moved to high-speed position at the end of said first portion, and then maintained in high-speed position during the remainder of the opening movement, so that the valve member moves at low speed during said first portion and at high speed during the remainder of the opening movement.

2. A valve unit having an openable and closeable valve member, power means, and power actuated drive means for operating the valve member to open and to close it as well as for automatically stopping the movements of the valve member at the end of each of its strokes; a two-speed gear change mechanism in the drive means having an actuating member movable between high-speed and low speed positions and operable for changing from high speed to low speed and vice versa, power means for motivating said actuating member, and control transmitting means governed by the operation of the drive mechanism and in timed relationship to the travel of the valve member for transmitting control to the power means whereby said actuating member is maintained in low-speed position during the first portion of the opening movement of the valve member, then is moved to high-speed position at the end of said first portion, and then maintained in high-speed position during the remainder of the opening movement, so that the valve member moves at low speed during said first portion and at high speed during the remainder of the opening movement with the low-speed and the high-speed being reversed during closing movement of the valve member.

3. A valve unit having an openable and closeable valve member, power actuated drive means comprising a main worm gear, a worm shaft driving the worm gear for closing and opening the valve, and means for automatically stopping the movements of the valve member at the end of its opening and closing; a two-speed gear change mechanism in the drive means having an actuating member movable in one direction for changing the drive means from high speed to low speed and movable in the opposite direction for changing the drive means from low speed to high speed, spring means for normally urging the actuating member into low-speed position, reciprocable power actuated means energizable and actuatable for moving the actuating member into high-speed position against the urging of the spring means and de-energizable and de-actuatable to allow the actuating member to be returned to low-speed position by the spring means, switch means having a stationary contact member and a movable contact member, switch actuating timing gear comprising an auxiliary worm gear provided on said worm shaft, and an auxiliary worm gear driven by said auxiliary worm shaft and rotatable together with said switch member whereby the switch means are governed from the operation of the drive mechanism and in timed relationship to the travel of the valve member for closing said switch to energize said power means and keeping it closed and the power means energized during the first portion of the closing movement of the valve member, then opening said switch at the end of said first portion to allow said actuating member to move to low-speed position and then maintaining the switch open during the remainder of the closing movement of the valve member, so that the valve member moves at high speed during said first portion and at low speed during the remainder of the closing movement.

4. A valve unit having an openable and closeable valve member and power actuated drive means provided with a motor for operating the valve member to open and to close the valve as well as for automatically stopping the movements of the valve member at the end of its opening and closing; a two-speed gear change mechanism in the drive means having an actuating member movable in one direction for changing the drive means from high speed to low speed and movable in the opposite direction for changing the drive means from low speed to high speed, spring means for normally urging the actuating member into low-speed position, reciprocable power-actuated means energizable and actuatable for moving the actuating member into high-speed position against the urging of the spring means and de-energizable and de-actuatable to allow the actuating member to be returned to low-speed position by the spring means, switch means in circuit with the power actuated means for energizing and actuating said power means, and switch controlling means governed by the operation of the drive mechanism and in timed relationship to the travel of the valve member for closing said switch to energize said power means and keeping it closed and the power means energized during the first portion of the closing movement of the valve member, then opening said switch at the end of said first portion to allow said actuating member to move to low-speed position, and then maintaining the switch open during the remainder of the closing movement, so that the valve member moves at high speed during said first portion and at low speed during the remainder of the closing movement.

5. A valve unit having an openable and closeable valve member, and power actuated gear drive means adapted for automatically stopping the movement of the valve member at the end of its opening and its closing comprising a gear train connected with the valve member and having a first power-input gear, a gear casing surrounding the gear-train and having a flanged input end the plane of which extends parallel to the plane of the input gear, a two-speed gear box having an output end flange connected to the input end of the casing, two-speed gearing in the gear-box having an output pinion meshing with the first input gear and having a second input gear extending parallel to the first input gear and also having an actuating member movable between high-speed and low-speed positions and thus settable for operating the two-speed gearing at high speed and at low speed respectively, a motor unit having a flange connection with the input end of the gear-box and having an output pinion meshing with the second input gear, and control transmitting means governed by the operation of the drive means and in timed relationship to the travel of the valve member for transmitting control to the actuating member whereby said actuating member is maintained in high-speed position during the first portion of the closing movement of the valve member, is moved to low-speed position at the end of said first portion, and is maintained in low-speed position during the remainder of the closing movement so that the valve member moves at high speed during said first portion and at low speed during the remainder of the closing movement, said gear-box being detachable from between the gear casing and the motor while said motor unit is attachable to the input end of the gear casing with the output pinion of the motor unit meshing with the first-mentioned input gear in the gear casing.

6. A two-speed gear shift mechanism for embodiment in a valve unit of the type that has an openable and closeable valve member and power-actuated drive means for operating the valve member to open and to close it as well as for automatically stopping the movements of the valve member at the end of its opening and closing strokes that comprise a gear casing, a gear train in the casing connected with the valve member and having an input gear, and a motor unit supported from the gear casing and having an output pinion for meshing with said input gear, two-speed mechanism interposed between the motor unit and the gear train to move the valve member at high speed during the first portion of its closing stroke and at low speed during the remainder of such stroke and vice versa during its opening stroke comprising a gear box interposable between the motor unit and the gear casing with the input end of the gear box flange-connected to the motor unit and the output end of the gear box flange-connected to the gear casing, two-speed gearing in the gear box having an input gear meshing with the output pinion of the motor unit, an output pinion meshing with the input gear in the gear casing, a countershaft fixed to said input gear and a primary-shaft fixed to said output pinion, both shafts being journalled in the gear box, a primary pinion fixed upon the input end of the primary shaft, a primary larger gear rotatable upon the primary shaft at the output end thereof adjacent to the output pinion yet axially non-displaceable upon the shaft, a clutch between the primary pinion and the primary larger gear for connecting the larger gear to the shaft, a secondary larger gear rotatable upon the counter-shaft and meshing with the primary pinion, a pinion fixed upon the output end of the countershaft meshing with the primary larger gear, a clutch between the secondary pinion and the secondary gear for connecting the secondary gear with the counter-shaft, interlocking means between the two clutches operable to engage the one clutch while disengaging the other clutch to change the movement of the valve member from high speed to low speed and vice versa comprising an actuating member movable between high-speed and low-speed positions and thus settable for operating the two-speed gearing at high speed and at low speed respectively; and control transmitting means governed by the operation of the drive means and in timed relationship to the travel of the valve member for transmitting control to the actuating member whereby said actuating member is maintained in high-speed position during the first portion of the closing movement of the valve member, is shifted to low-speed position at the end of said first portion, and is maintained in low-speed position during the remainder of the closing movement, so that the valve member moves at high speed during said first portion and at low speed during the remainder of the closing movement.

7. A two-speed gear shift mechanism according to claim 6, with the addition of power means for operating the interlocking means to effect the required change between high-speed and low-speed movements of the valve member.

8. A two-speed gear shift mechanism according to claim 6, in which the interlocking means comprise spring holding means for normally urging the gear shift member into low-speed position, and reciprocable means energizable for moving the actuating member to effect the required change between high-speed and low-speed movements of the valve member.

9. A valve unit having an openable and closeable valve member, and power actuated drive means including a drive shaft for operating the valve member to open and close it as well as for automatically stopping the movements of the valve member at the end of each of its strokes, comprising a two-speed gear change mechanism in the drive means having an actuating member movable between high speed and low-speed position and operable for changing from high speed to low speed and vice versa, power means for motivating said actuating member, and control transmitting means associated with and operated by the drive shaft for transmitting control to the power means in timed relationship to the travel of the valve member, whereby said actuating member is maintained in low-speed position during the first portion of the opening movement of the valve member, then is moved to high-speed position at the end of said first portion, and then maintained in high-speed position during the remainder of the opening movement, so that the valve member moves at low-speed during said first portion and at high-speed during the remainder of the opening movement.

10. A valve unit as set forth in claim 9 in in which the drive shaft has a worm thereon, and the control transmitting means includes a worm gear meshing with and driven by the worm for transmitting control to the power means.

11. A valve unit having an openable and closeable valve unit and power actuated drive means for operating the valve member to open and close it as well as for automatically stopping the movements of the valve member at the end of each of its strokes, comprising a two-speed gear change mechanism in the drive means having an actuating member movable between high-speed and low-speed positions and operable for changing from high speed to low speed and vice versa, power means for motivating said actuating member including a spring and a reciprocable member, the spring moving the actuating member to low-speed position and the reciprocable member moving the actuating member to high-speed position against the spring, and control transmitting means actuated by the drive mechanism in timed relationship to the travel of the valve member for transmitting control to the reciprocable member whereby said actuating member is maintained in low-speed position by the spring during the first portion of the opening movement of the valve member, then is moved to high-speed position at the end of the first portion by the reciprocable member, and maintained in high-speed position during the remainder of the opening movement against the spring, so that the valve member moves at low speed during the first portion and at high speed during the remainder of the opening movement.

12. A valve unit as set forth in claim 11 in which the control transmitting means is an electric switch in an electric circuit actuated by the drive mechanism and the reciprocable member is a solenoid in the electric circuit which when energized by closing of the switch will move the actuating member to high-speed position against the spring.

HAROLD O. KRON.

References Cited in the file of this patent
UNITED STATES PATENTS

| Number | Name | Date |
|---|---|---|
| 1,814,424 | Barr | July 14, 1931 |
| 1,966,209 | Miller | July 10, 1934 |
| 2,180,019 | Peterson | Nov. 14, 1939 |
| 2,270,581 | Clarke | Jan. 20, 1942 |
| 2,482,568 | Werner | Sept. 20, 1949 |
| 2,500,796 | Bullard | Mar. 14, 1950 |
| 2,501,994 | Dewey | Mar. 28, 1950 |